United States Patent
Kathman

[11] Patent Number: 6,157,502
[45] Date of Patent: Dec. 5, 2000

[54] OPTICAL BENCH CIRCULARIZER HAVING ALIGNMENT INDENTATIONS AND ASSOCIATED METHODS

[75] Inventor: Alan D. Kathman, Charlotte, N.C.

[73] Assignee: Digital Optics Corporation, Charlotte, N.C.

[21] Appl. No.: 09/347,818

[22] Filed: Jul. 2, 1999

Related U.S. Application Data

[60] Provisional application No. 60/091,732, Jul. 2, 1998.

[51] Int. Cl.[7] ............................................... G02B 7/02
[52] U.S. Cl. ........................................ 359/819; 359/641
[58] Field of Search .................... 359/618, 619, 359/621, 622, 641, 819, 566, 574; 362/455, 456

[56] References Cited

U.S. PATENT DOCUMENTS

| | | | |
|---|---|---|---|
| 4,697,880 | 10/1987 | Anderstein et al. | 359/641 |
| 5,237,451 | 8/1993 | Saxe | 359/565 |

*Primary Examiner*—Huy Mai
*Attorney, Agent, or Firm*—Susan S. Morse

[57] ABSTRACT

An optical apparatus for circularizing a laser beam includes a bench having indentations thereon and optical elements provided in these indentations. A first optical element has a high numerical aperture. A second optical element collimates the beam output by the first optical element and is spaced from the first optical element. This spacing is determined in accordance with a location of the beam output by the first optical element at which the beam will be most circular. The indentation in which the second optical element is placed may be both vertically and horizontally displaced from the indentation in which the first optical element is placed.

19 Claims, 2 Drawing Sheets

OPTICAL BENCH CIRCULARIZER HAVING ALIGNMENT INDENTATIONS AND ASSOCIATED METHODS

CROSS-REFERENCES TO RELATED APPLICATIONS

The present application claims priority under 35 U.S.C. §119 to Provisional Patent Application No. 60/091,732 filed Jul. 2, 1998, the entire contents of which are hereby incorporated by reference.

BACKGROUND OF THE INVENTION

1. Field of the Invention

The present invention is directed to providing a circularizer for use with a laser ouputting a non-circular beam. More particularly, the present invention is directed to a circularizer including an optical element having a high numerical aperture and an additional optical element, both of which are provided on a bench having features for receiving the optical elements therein.

2. Description of Related Art

Laser diodes are compact, efficient, inexpensive and ideal for mass production. This has lead to an increasing number of applications for which laser diodes are used. However, the gain region of the laser diodes is quite small and asymmetric. This results in a small and asymmetric resonator mode. Consequently, the beam divergence is severe and asymmetric.

Failure to reduce or eliminate the ellipticity of the beam is sometimes unimportant, but many applications require collimated beams with low optical aberrations. If the beam is to be collimated with a conventional lens for a particular application, the resulting beam dimensions will be different in the two directions, resulting in an elliptical beam. Thus, the ellipticity of the beam must be reduced by a subsequent optical system.

Astigmatism is a further property of laser diodes which presents an additional potential disadvantage in many applications. An uncorrected astigmatic laser beam cannot be collimated by a single radially symmetric lens. With an astigmatic laser, each axis appears to be diverging from a different axial point. Thus, collimation of both axes simultaneously with a single element requires an anamorphic element with different focal lengths for each axis. This astigmatism is often corrected most advantageously by a subsequent optical system.

There have been numerous design solutions for collimating, circularizing and correcting wavefronts of diode lasers. One such solution includes using conventional cylindrical lenses to collimate each axis independently. However, the performance of such cylindrical lenses is degraded for more asymmetric beams, since skew rays cannot be corrected, and is hard to align. Attempts to solve this difficulty in alignment are disclosed, for example, in U.S. Pat. No. 5,581,414 entitled "Microlens Assemblies and Couplers" to Snyder which mechanically establishes a fixed relationship between a pair of microlenses. A spacer positioned between the pair of microlenses includes a hole which acts as a hard aperture allowing light to pass between the lenses. The spacer provides a set spacing corresponding to the thickness of the spacer. The cylindrical lenses must be placed very close to the laser, i.e., within a few microns. Since alignment tolerances are proportional to the desired distance, such a small distance results in a very small or tight tolerance, i.e., sub-micron, which is very expensive to achieve. However, by having the collimating optics so close to the laser, the astigmatism of the laser may be ignored, since the beam will not have had time to spread appreciably.

Another solution uses cylindrical lenses in conjunction with an aspheric collimator as disclosed in U.S. Pat. No. 5,553,174 entitled "Monolithic Cylindrical Optic" to Snyder. The '174 patent characterized the problems with the solution of the '414 patent were indicated as including mounting the lenses in close proximity to the face of the laser diode, thereby requiring that a can housing the laser diode be opened or the laser diode be provided without the can. In the '174 patent, this problem is solved by placing an aspheric collimator in front of a window of the can containing the laser diode to collimate the beam in the fast axis. A following pulled cylindrical lens is then used to collimate and magnify the slow axis to provide a collimated beam which is nearly circular. However, the aspheric collimator is not very light efficient and the pulled cylindrical lens is difficult to make.

Another configuration is shown, for example, in U.S. Pat. No. 5,229,883 to Jackson et al. As can be seen in FIGS. 2 and 3 of Jackson et al., a cylindrical lens 22 is used in conjunction with a binary optical element 28. The binary optical element 28 is designed such that each ray of light from the diverging input light source will travel the same optical path length or vary from the optical path length by a discrete multiple of the wavelength of the light traveling from its source to its exit from the front surface of the binary optical element. While the low horizontal divergence may typically be collimated with cylindrical optical elements with few resulting aberrations, collimation of the fast vertical divergence requires optical elements with increased optical power at a much lower f number which generally results in significantly tighter alignment tolerances or increased optical aberrations with the collimated output.

The cylindrical lens 22 is used to collimate the laser diode's output in the fast axis. Binary optics 28 include a substrate on which a binary optical diffraction pattern is etched. The binary optic diffraction pattern is typically an eight phase level structure which corrects for optical path differences inherent in the divergent light. The binary optical element collimates the slow axis divergence and corrects for skew ray aberration of rays not in either the fast or slow axis. These additional corrections are readily achievable in a binary optical element whose diffraction pattern is chosen so as to have each optical ray travel in equal optical path lengths or an optical path length that varies from that equal optical path length by integer multiple of the wavelength of light traveling therethrough.

In order to provide proper correction of the beam output from the laser diode 10, the cylindrical lens 22 and the diffractive optical element 28 in the Jackson et al. configuration must be both properly positioned along the optical axis, but also rotationally aligned with one another. This rotation alignment is crucial and exacting, since the different axes are treated differently. This rotational alignment can be difficult and sensitive, requiring expensive continuous rotational alignment.

The above solutions are therefore either expensive due to tight tolerance requirements or not efficient at delivering light. The less expensive solutions are satisfactory for uses which do not require a lot of power from the laser to operate effectively. Thus, while the previous inexpensive solutions only provided approximately 30–40% of the laser power to the system, it was easy to make lasers of sufficiently high power to meet the requirements for the system. In other words, the high losses could be tolerated due to the availability of sufficiently powerfull lasers.

However, with the advent of technologies requiring higher powers to operate, e.g., digital video disks and flying head magneto-optic drivers, delivery of higher laser powers to the systems is required. These increased power requirements can no longer be met by simply providing a more powerful laser, so a more efficient, cheaper collector lens is required.

One solution which teaches using high numerical aperture lenses for collecting a majority of the laser power when circularizing and collimating a beam is set forth in U.S. Pat. No. 5,636,059 to Snyder entitled "Cylindrical Microlens External Cavity for Laser Diode Frequency Control.". The configuration disclosed in this patent uses two cylindrical lenses, each of which collimates a respective axis of the laser beam, and requires active alignment.

When two elements, both providing optical power, need to be aligned, often active alignment is required. Active alignment is performed by turning on a beam and continuously adjusting the optical elements until a desired beam is achieved. Such active alignment is difficult and expensive. When optical power is provided by both elements, optimal alignment of a single element alone may not provide satisfactory alignment with the other optical element to provide the optimum results for the system as a whole. Each element must be precisely aligned.

SUMMARY OF THE INVENTION

The present invention is therefore directed to an optical apparatus and associated methods which substantially overcomes one or more of the problems due to the limitations and disadvantages of the related art.

It is another object of the present invention to provide beam shaping in a system which is compact, uses passively aligned optics, and mass-produced.

It is a further object of the present invention to provide beam shaping in a system which only requires one precision step, i.e., an alignment tolerance of a few microns in one dimension.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other object, features and advantages of the present invention will become readily apparent to those skilled in the art from the detailed description which follows and from the accompanying drawings, in which.

DETAILED DESCRIPTION OF PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figures 1A, 1B, 1C, 2:
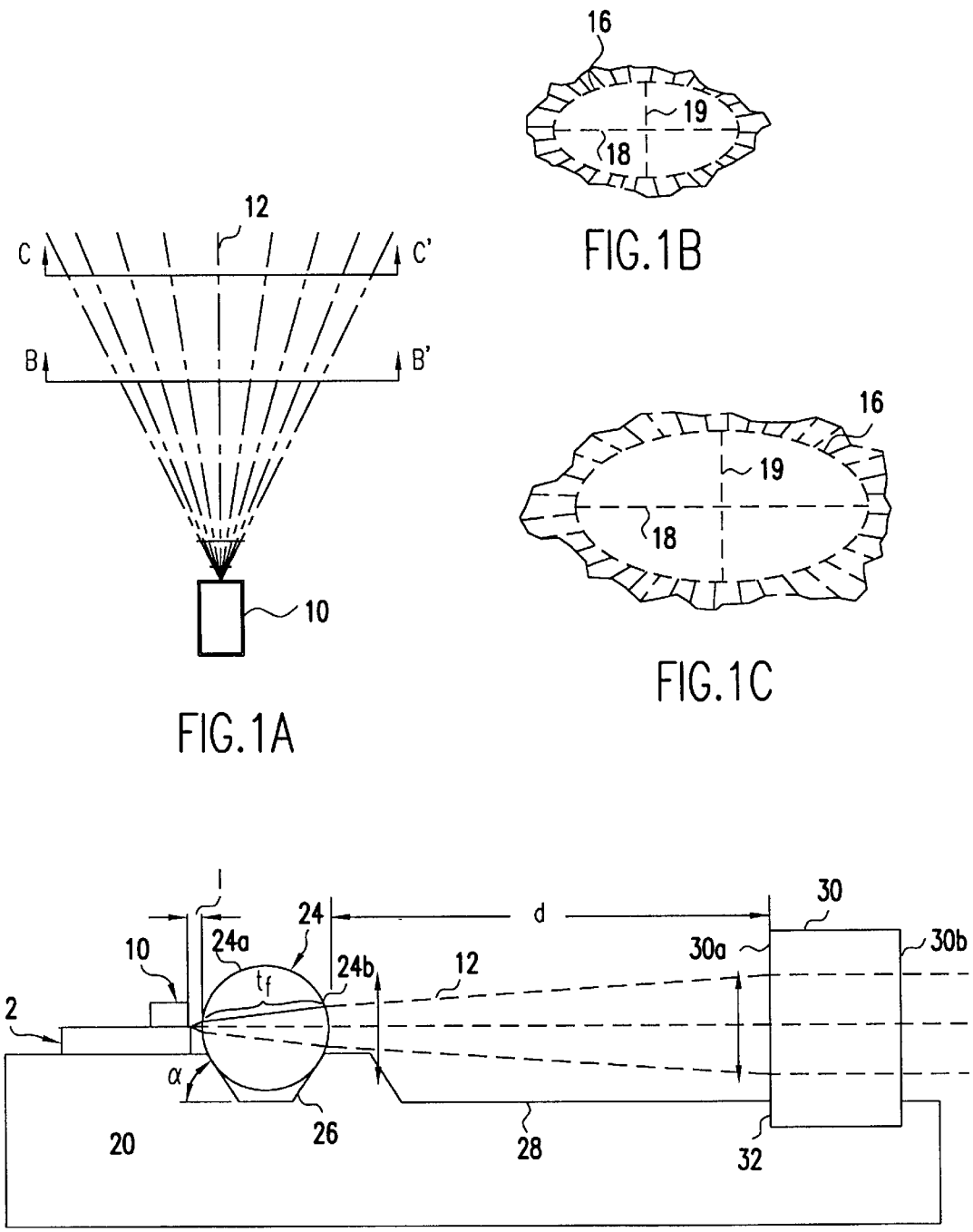
FIG. 1A shows a beam output from a laser without any beam shaping thereof.
FIG. 1B shows the beam resulting from the configuration in FIG. 1a taken along the line b-b'.
FIG. 1C shows the beam resulting from the configuration in FIG. 1a taken along the line c-c'.
FIG. 2 shows a side view of an embodiment of the present invention.

As shown in FIG. 1A, a laser diode 10 outputs a beam along an optical axis 12. As can be seen in FIGS. 1B and 1C, a beam profile 16 becomes elliptical after traveling a few microns and stays elliptical and gets larger, so that the difference between the beam size along the axes increases, as it propagates away from the laser diode 10. In particular, the beam is wider or more divergent along a fast axis 18, and is narrower or less divergent along a slow axis 19. Conventional configurations used to address this ellipticity were discussed above in the Background. As noted above, it is often desirable to shape this beam to obtain a more circular profile.

In order to retain as much power as possible in the laser beam, it is desirable to use a refractive element having a high numerical aperture at least with respect to the fast axis. The numerical aperture is the product of the refractive index of the immersing medium, 1.0 for air, and the sine of the half-angle of the maximum cone of light which can be imaged by the element. The square of the numerical aperture is a measure of the light gathering power of the system, i.e., the larger the square, the greater the light gathering power. A high numerical aperture may be provided by an element having a circular profile along the axis of interest, such as a ball lens or a fiber microlens. The numerical aperture is preferably at least than 0.25, more preferably at least 0.5. For efficient use with a range of typical laser diodes, the fast axis numerical aperture should be greater than 0.3.

A configuration incorporating a refractive element having a high numerical aperture mounted in a bench is shown in FIG. 2. It is noted that the relative sizes of the elements in FIG. 2 are correctly illustrated. As shown in FIG. 2, a laser 10, a refractive element 24 and a collimating/correcting optical element 30 are mounted on a bench 20, preferably a silicon bench. The laser 10 is preferably mounted on an electronic bench 22, which in turn is mounted on the bench 20. The electronic bench 22 contains the electronics needed for the operation of the laser 10.

The refractive element 24 is mounted in a v-groove 26 in the bench 20. A suitable refractive element 24 is, for example, a gradient index cylindrical microlens from DORIC LENSES, having a diameter between 500–1000 $\mu$. A lower plane 28 is provided to accommodate the diverging beam 12. The optical element 30 is mounted in a notch 32 in the lower plane 28.

Figure 3:
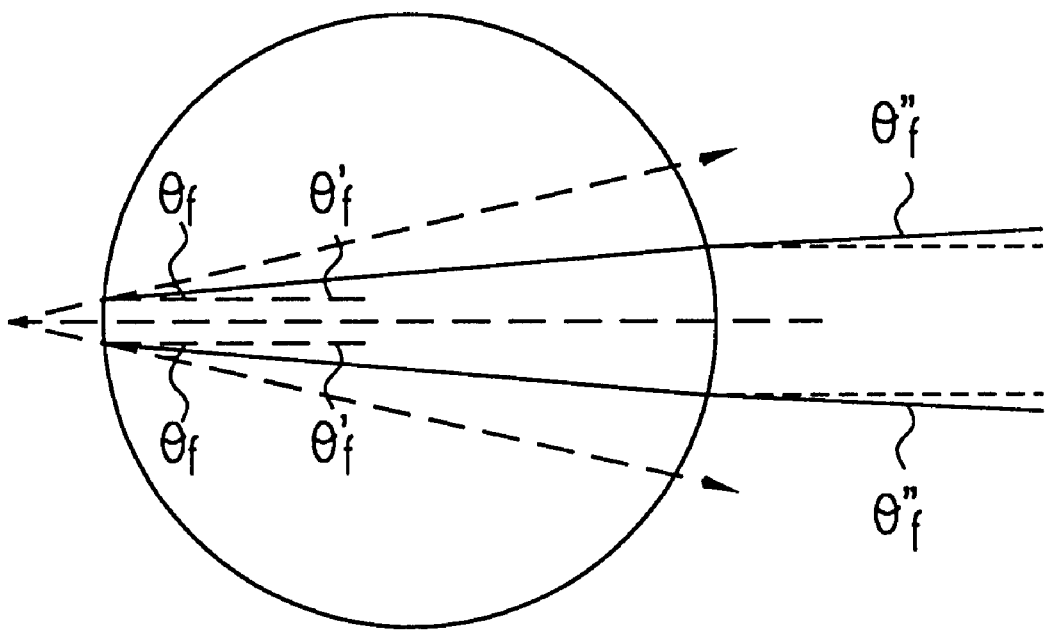
FIG. 3 is a schematic of the light along the fast axis traversing the high numerical aperture divergence altering element shown in FIG. 2.

The circularizing of the present invention involves using an element with a high numerical aperture to alter the divergence angle along the fast axis such that, at the output of the high numerical aperture element, the fast axis has a divergence that is less than the divergence angle of the slow axis. In other words, $\theta_f'' < \theta_s$. FIG. 3 shows the path of the laser beam 12 along the fast axis while traversing the high numerical aperture element 24. The high numerical aperture element does not affect the divergence angle of the beam along the slow axis.

Such an alteration in the divergence of the beam along the fast axis allows the dimensions along both axes to be equal at some propagation point. The second optical element 30, which provides the desired beam shape, is to be located at the point where the diameter of the beam 12 is substantially the same along both axes, i.e., the beam is substantially circular. In the example shown in FIG. 2, the second optical element 30 collimates the beam 12. The point at which the beam is substantially circular will determine the separation between the v-groove 26 and the notch 32.

This separation is governed by the following equations:

$$D_s = 2(1 + t_s + d) \tan(\theta_s/2)$$

$$D_f = 2 l \tan(\theta_f/2) + 2 t_f \tan(\theta_f'/2) + 2d \tan(\theta_f''/2)$$

where D is the diameter of the spot on the input surface 30a of the optical element 30 along the respective axes, l is the distance from the laser 10 to the input surface 24a of the refractive element, $t_s$ is the distance traversed by the slow axis in the refractive element 24, d is the distance from the output surface 24b of the refractive element 24 and the input surface 30a of the second optical element 30, $t_f$ is the distance traversed by the fast axis in the refractive element 24, $\theta_s$ is the divergence angle along the slow axis of the beam output by the laser 10, $\theta_f$ is the divergence angle along the fast axis of the beam output by the laser 10, $\theta_f'$ is the divergence angle along the fast axis of the beam after the input surface 24a of the refractive element 24, and $\theta_f''$ is the divergence angle along the fast axis of the beam after the output surface 24b of the refractive element 24. Note that $t_s$ and $t_f$ are roughly the diameter of the cross-section of the refractive element. The separation between the downstream edge of the v-groove 26 and the upstream edge of the notch 32 is the distance d plus whatever portion of the refractive element 24 extends beyond the downstream edge of the v-groove 26.

For most lasers, the divergence angles $\theta_f$ and $\theta_s$ are fixed. While the value l can be set, typically the laser 10 will be placed as close as possible to the refractive element 24. Thus, in designing the configuration shown in FIG. 2, the degrees of freedom in obtaining a desired diameter D are d, $\theta_f''$ and the diameter of the refractive element 30.

Typically, the value of D is chosen by the application. The amount of space available in a desired application may be used to set d and/or the availability of suitable lenses may be used to set $\theta_f''$ and the lens diameter. For example, assume a laser 10 having divergence angles of approximately 10° ($\theta_s$) by 30° ($\theta_f$), full width at half maximum, is placed a distance of 60 microns (l) from the input surface 24a of the refractive element. Then, the spot size on the input surface 24a of the refractive element would be approximately 10.5 microns by 32 microns. If the desired spot diameter (D) of the collimated beam is 400 microns along both axes, then the divergence angle along the fast axis upon exiting the output surface 24b of the refractive element should be approximately 5° ($\theta_f''$). This will result in an angle along the fast axis from the input surface 24a of the refractive element to the output surface 24b of the refractive element of approximately 17.50 ($\theta_f'$). Using a refractive element 24 having a diameter of 500 microns, the distance between the output surface 24b of the refractive element 24 and the input surface 30a of the second optical element 30 will be approximately 1760 microns. This will result in a circular beam on the input surface 30a of the second optical element 30 of approximately 400 microns.

The first surface of the second optical element 30 preferably has a collimating element formed thereon for collimating the beam incident thereon. Advantageously, the collimating element is formed by a diffractive pattern, preferably a computer generated hologram. Once collimated, by definition, the beam stops diverging, so the cross-section of the beam is now stabilized. Most applications also require that the astigmatism of the beam 12 be corrected. This astigmatism arises due to a difference between the respective locations of the center of curvature along the fast and slow axes. For the fast axis, the center of curvature is right on the front of the laser. For the slow axis, the center of curvature is behind the front of the laser. Therefore, a diffractive element is formed on at least one of the surfaces 30a, 30b of the second optical element for correcting this astigmatism. A diffractive element which is part of the second optical element may also correct any other aberrations as needed.

The second optical element 30 may include other optical elements on either surface 30a, 30b thereof for correcting for additional imperfections in the beam and/or for providing a desired shape to the beam. Any of the diffractives incorporating a computer generated hologram may be designed using the computer calculations and manufactured using lithographic techniques taught by U.S. Pat. No. 5,161,059 to Swanson, which is hereby incorporated by reference, for a particular input and desired output beam.

The bench configuration of FIG. 2 may be reliably, repeatedly, and cheaply manufactured. The angle a of the side wall of the v-groove 26 receiving the refractive element 24 is preferably a natural feature of the material used for the bench that has been wet etched, so it is easy to form repeatedly. For silicon, this angle is approximately 54.7°. The depth of the v-groove may be determined knowing the diameter of the refractive element 24, the height of the electronic bench 22, and the angle a such that the center of the refractive element 24 is aligned with the output of the laser 10 while allowing the beam at the output surface 24b to propagate unencumbered. The vertical positional tolerance for the refractive element 24 is ±20 µ. The tightest tolerance of the configuration shown in FIG. 2 is the space between the laser 10 and the refractive element 24. For the configuration in FIG. 2, this spacing is typically on the order of 50–100 µ, with a horizontal positional tolerance of a few microns, e.g., ±2 µ. However, it is noted that the electronic bench 20, on which the laser 10 is mounted, can be moved to adjust this dimension if necessary. This adjustment may be made while the laser is on, thus constituting active alignment. However, since this active alignment is only along one dimension, it is much easier to achieve than typical active alignment. Alternatively, the space from the front of the electronic bench to the input surface 24a may be measured and adjusted. The refractive element 24 is advantageously slightly defocussed to help the beam 12 attain a more usable size.

The other optical element 30 is mounted in the notch 32 on the lower plane 28 which is below the plane in which the v-groove 26 is formed. This lower plane 28 is advantageous for accommodating the expanding diameter of the beam. The notch may be formed mechanically, e.g., using a dicing saw, photolithographically, e.g., using dry etching, or any method for achieving straight side walls. The vertical positional tolerance for the second optical element 32 and the notch 34 is ±20 µ, and the horizontal positional tolerance for the second optical element 32 is ±15 µ. The lower plane 28 may be formed using any of the methods for forming the v-groove and the notch. Advantageously, the lower plane 28 is formed simultaneously with the formation of the v-groove, resulting in the lower plane being along the same plane as the bottom of the v-groove.

The configuration of FIG. 2 can thus be repeatedly, accurately and cheaply made by forming in batch process the silicon bench 20 having the indentations, i.e., the v-groove 26 and the notch 32, for receiving the refractive element 24 and the second optical element 30 respectively therein. The refractive element 24 and the other optical element 30 are made separately in known manners, and then placed in their respective indentations. Preferably, the other optical element 30 is a diffractive element made on a wafer level and then diced to form an individual diffractive element. Once in place, these elements are then bonded to their respective indentations in known manners, e.g., UV cured adhesive bonding, solder bonding, anodic bonding, frit bonding. Note that the v-groove 26 provides more surface contact for bonding the refractive element 24 having a circular cross-section therein. If the electronic bench 22 is used, then the laser 10 is mounted thereon and the electronic bench 22 is mounted onto the silicon bench using fiducial marks on the bench 20. If the electronic bench 22 is not used, the bench 20 may be formed to provide the laser 10 with the requisite height so that it is aligned with the refractive element 24. The laser 10 is then mounted on the bench 20 using fiducial marks on the silicon bench.

Thus, the use of a bench to form a beam shaper in accordance with the present invention allows the optics of the beam shaper to be mass-produced and passively aligned with relatively loose positional tolerances, e.g., on the order of tens of microns. The only tight positional tolerance, e.g., on the order of a few microns, is one dimensional, i.e., the horizontal distance between the laser and the first surface of the high numerical aperture lens. By designing the beam shaper to have only one degree of freedom, i.e., this horizontal distance, even if active alignment is needed, it is only along one dimension and is readily achieved. Further, by placing the optical power in the high numerical aperture lens and allowing propagation to equalize the beam spread, the light may by efficiently collected. The binary optical element, placed at this equalized beam spread position, will provide at least astigmatic correction.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims and their equivalents.

What is claimed is:

1. An optical apparatus comprising:
    a bench having indentations thereon;
    a first optical element having a high numerical aperture positioned in a first indentation of said bench, said first optical element having a circular profile along an axis along which a light path is to be altered by said first optical element; and
    a second optical element for collimating a beam output by said first optical element, said second optical element being positioned in a second indentation of said bench, said second indentation being spaced from said first indentation.

2. The apparatus of claim 1, further comprising a laser mounted on said bench, said laser outputting a non-circular beam to a center of said first optical element.

3. The apparatus of claim 2, further comprising a mount containing electronics for operating said laser mounted on said bench, said laser being mounted on said mount.

4. The apparatus of claim 2, wherein said second indentation is spaced from said first indentation such that the beam output from said first optical element has a substantially circular cross-section at an input surface of said second optical element.

5. The apparatus of claim 2, wherein said first optical element has a circular cross-section along a fast axis of the beam output from the laser.

6. The apparatus of claim 1, wherein said first indentation is a v-groove.

7. The apparatus of claim 1, wherein said first optical element is a gradient index cylindrical microlens.

8. The apparatus of claim 1, wherein said second indentation is spaced both horizontally and vertically from said first indentation.

9. The optical apparatus of claim 1, wherein, when said first optical element receives a non-circular beam having a first divergence angle and a second divergence angle along respective orthogonal axes, the first divergence angle being larger than the second divergence angle, said first optical element outputs a non-circular beam having the first divergence angle being less than the second divergence angle, wherein the first divergence angle output from the first optical element is not zero.

10. The optical apparatus of claim 1, wherein the beam output by said first optical element has not been collimated along either axes by said first optical element.

11. A method of making a optical assembly comprising:
    forming indentations in a bench;
    mounting a first optical element having a high numerical aperture in a first indentation of the bench;
    mounting a second optical element for collimating a beam output from the first optical element in a second indentation of the bench;
    mounting a laser on a mount containing electronics for operating the laser and mounting the mount on the bench; and
    moving the mount until the beam output from the first optical element has a substantially circular cross-section at an input surface of the second optical element.

12. The method of claim 11, further comprising mounting a laser adjacent said first optical element, said laser outputting a non-circular beam to a center of said first optical element.

13. The method of claim 11, further comprising providing the first optical element with a circular profile along an axis along which a light path is to be altered by the first optical element.

14. The method of claim 13, wherein the first optical element is a gradient index cylindrical microlens.

15. The method of claim 11, wherein, when the first optical element receives a non-circular beam having a first divergence angle and a second divergence angle along respective orthogonal axes, the first divergence angle being larger than the second divergence angle, the first optical element outputting a non-circular beam having the first divergence angle being less than the second divergence angle, wherein the first divergence angle output from the first optical element is not zero.

16. The method of claim 11, wherein the beam output by the first optical element has not been collimated along either axes by the first optical element.

17. A method of making a optical assembly comprising:
    forming indentations in a bench;
    mounting a first optical element having a high numerical aperture in a first indentation of the bench, the first optical element having a circular profile along an axis along which a light path is to be altered by the first optical element; and
    mounting a second optical element for collimating a beam output from the first optical element in a second indentation of the bench.

18. The method of claim 17, wherein, when the first optical element receives a non-circular beam having a first divergence angle and a second divergence angle along respective orthogonal axes, the first divergence angle being larger than the second divergence angle, the first optical element outputting a non-circular beam having the first divergence angle being less than the second divergence angle, wherein the first divergence angle output from the first optical element is not zero.

19. The method of claim 17, wherein the beam output by the first optical element has not been collimated along either axes by the first optical element.

* * * * *